US005605270A

United States Patent [19]

Dunn

[11] Patent Number: 5,605,270

[45] Date of Patent: Feb. 25, 1997

[54] METHOD AND APPARATUS FOR APPLYING FASTENERS TO PICTURE FRAMES

[75] Inventor: Brian J. Dunn, Oakland, Calif.

[73] Assignee: Bullseye Fastener Development, Inc., Oakland, Calif.

[21] Appl. No.: 345,639

[22] Filed: Nov. 28, 1994

[51] Int. Cl.[6] .................... B32Q 3/00; B27F 7/09; B27F 7/34

[52] U.S. Cl. .................... 227/140; 227/145; 227/150; 227/152; 227/155

[58] Field of Search .................... 227/140, 144, 227/145, 150, 152, 153, 154, 155, 148, 151, 130, 39, 40

[56] References Cited

U.S. PATENT DOCUMENTS

| | | | |
|---|---|---|---|
| 3,140,493 | 7/1964 | Ennis | 227/145 |
| 4,241,651 | 12/1980 | Castillo et al. | 227/152 |
| 4,392,599 | 7/1983 | Russell | 227/152 |
| 4,623,083 | 11/1986 | Pagano | 227/154 |
| 4,763,825 | 8/1988 | Albin | 227/142 X |
| 4,830,257 | 5/1989 | Lin | 227/152 |
| 4,876,787 | 10/1989 | Ditty et al. | 227/152 |

*Primary Examiner*—Scott A. Smith
*Attorney, Agent, or Firm*—Harris Zimmerman

[57] ABSTRACT

An apparatus for final assembly of framed artwork includes a table supported on a structural frame, and a pneumatic actuator for raising and lowering the table. Two pairs of tubular rectangular beams extend in rectangular array superjacent to the table, and are secured at opposed ends to the upper ends of respective vertical supports. Clamping sleeves secured to the ends of the lateral beams engage the longitudinal beams, so that the lateral beams may be slidably positioned along the longitudinal beams. A plurality of modules are provided for installing tabs in a picture frame supported on the table, each module including a support plate having a dogleg cutout which is adapted to receive one of the longitudinal or lateral beams, and an adjacent clamp to secure the support plate at any point along the beam. A magazine is secured to the support plate by a pivot assembly at the upper end of the magazine, with the freely pivoting lower end of the magazine depending from the support plate. An anvil is supported in spaced apart opposition to the lower end of the magazine, and a third pneumatic actuator extends laterally from the support plate to rotate the lower end of the magazine and clamp the frame against the anvil. A fourth pneumatic actuator supported on the magazine is coupled through a lever arrangement to a driver blade extending through the lower end of the magazine. The driver blade engages the lowermost fastener in the magazine and ejects it forcefully, driving it into the interior opening of the frame on the table.

25 Claims, 6 Drawing Sheets

METHOD AND APPARATUS FOR APPLYING FASTENERS TO PICTURE FRAMES

BACKGROUND OF THE INVENTION

This invention generally relates to devices for applying fasteners, and more specifically to an apparatus for automatically driving a plurality of fasteners into a picture frame to secure the glazing, or artwork, and the backing in the frame.

In the manufacture of framed artwork, such as photographs, prints and paintings and the like, the typical practice is to place a transparent glass or plastic plate within a flange formed in the frame opening, place the artwork or other image-bearing flat article on the transparent plate, and place a backing member atop the artwork. To secure these layers in place within the frame, a plurality of fasteners are driven into the interior edge of the frame, so that the tails of the fasteners extend to impinge on the back surface of the backing member. The fasteners, which may comprise glazier points, staples, tabs, or brads are generally driven by hand, using either manual or power-assisted tools.

Power-assisted tools, which may be pneumatically or electrically operated, are typically configured with a moving armature or piston that translates linearly to drive a fastener into the interior frame edge. The armature or piston requires a minimum length and travel path, and these factors determine that the tool must have a minimum length on the order of several inches. For small frames, the tool length may interfere with or prevent installing fasteners effectively within the interior opening. Large frames may require twelve or more fasteners to secure the backing within the opening, and the manual effort required to place and actuate the fastener tool multiple times for each frame results in a labor cost that cannot be reduced or avoided.

Moreover, in a high volume manufacturing setting, the manual movements involved in using the same tool to perform a task repetitively for hundreds of frames may cause the tool operator to experience extreme fatigue and repetitive stress injuries such as carpal tunnel syndrome as well as other neuromuscular disorders. The result may be personal difficulties for the tool operator and financial liabilities for the employer.

There is no tool or apparatus available in the art which combines the attributes of alleviating operator stress effects, reducing labor costs involved in installing multiple fasteners in each frame, and installing fasteners in small frame openings.

SUMMARY OF THE INVENTION

The present invention generally comprises a method and apparatus for final assembly of framed artwork or wood frames by installation of fasteners to secure a backing member which retains the artwork and glazing within the frame.

The apparatus of the invention includes a quartet of vertical supports disposed at the vertices of a rectangular layout. The vertical supports may be formed of tubular rectangular beams. A base plate is supported horizontally by the vertical supports, and a plurality of posts extend upwardly from the base plate. A table is secured to the posts in vertically translatable fashion, and a first pneumatic actuator is secured between the base plate and the table to selectively raise and lower the table. The table is provided with a first fence extending upwardly therefrom to position a picture frame upon the table. A second fence is disposed orthogonally to the first fence, and includes an ejector bar secured to a second pneumatic actuator. The two fences provide accurate positioning of a frame on the table, and the ejector bar discharges the frame when the final assembly process is completed, as explained below.

A pair of tubular rectangular beams extend longitudinally in parallel, spaced apart relationship superjacent to the table, and are secured at opposed ends to the upper ends of respective vertical supports. Another pair of tubular rectangular beams extend laterally in parallel, spaced apart relationship superjacent to the table, and are oriented orthogonally to the longitudinal beams. Clamping sleeves secured to the ends of the lateral beams engage the longitudinal beams, so that the lateral beams may be slidably positioned along the longitudinal beams. The tubular rectangular beams that comprise the vertical supports and longitudinal and lateral beams all include interior spaces that are sealed in pressure-tight fashion to form a reservoir for a pneumatic air supply. Air hose connectors join the interior spaces of all the tubular beams to a source of air pressure to supply all the pneumatic actuators enumerated herein.

The apparatus further includes a plurality of modules for installing tabs or like fasteners in a picture frame supported on the table. Each module includes a support plate having a dogleg cutout which is adapted to receive one of the longitudinal or lateral beams, and an adjacent clamp to secure the support plate at any point along the beam. A magazine is secured to the support plate by a pivot assembly at the upper end of the magazine, with the freely pivoting lower end of the magazine depending from the support plate. Each module further contains a third pneumatic actuator extending laterally between the support plate and the pivoting lower end of the magazine. An arm extends obliquely downwardly from each support plate, and terminates in an anvil disposed in spaced apart opposition to the lower end of the magazine. The third pneumatic actuator is activated to rotate the lower end of the magazine toward the adjacent anvil, urging the lower end of the magazine to impinge on the interior surface of the opening in the frame and clamping the frame against the anvil.

The magazine contains a large plurality of fasteners in a vertically stacked column, and a spring feed arrangement to urge the column downwardly. A driver blade extends through the lower end of the magazine, and is coupled through a lever arrangement to a fourth pneumatic actuator supported on the magazine. Activation of the fourth pneumatic actuator operates the lever arrangement to translate the driver blade laterally. The driver blade engages the lowermost fastener in the magazine and ejects it forcefully, driving it into the surface of the interior opening of the frame on the table. After the fourth pneumatic actuator is deactivated, the third actuator is deactivated to release the frame. Thereafter, the first actuator is deactivated to lower the table, and the ejector bar pushes the frame from the table, and a new frame is placed on the table to reiterate the process.

All of the actuators may be connected to air supply nipples located in the longitudinal and lateral beams of the frame. The module actuators fire generally simultaneously, and the air pressure reservoir constituted by the interior spaces of the beams prevents malfunction of the actuators due to pressure drawdown.

The modules located superjacently to the positioning fences employ the fences as anvils, so that the arms and anvils of those modules are removed.

The method of the invention includes the steps of placing the frame on the table (either manually or by conveyor)

abutting the two positioning fences, raising the table so that the frame sides are disposed between the fences or anvils and the lower ends of the magazines, activating the third actuators to clamp the frame, activating the fourth actuators to drive the fasteners into the frame, sequentially deactivating the actuators to release the frame, and ejecting the finished frame from the table onto a slide or similar receiving device.

DESCRIPTION OF THE PREFERRED EMBODIMENT

Figure 1:
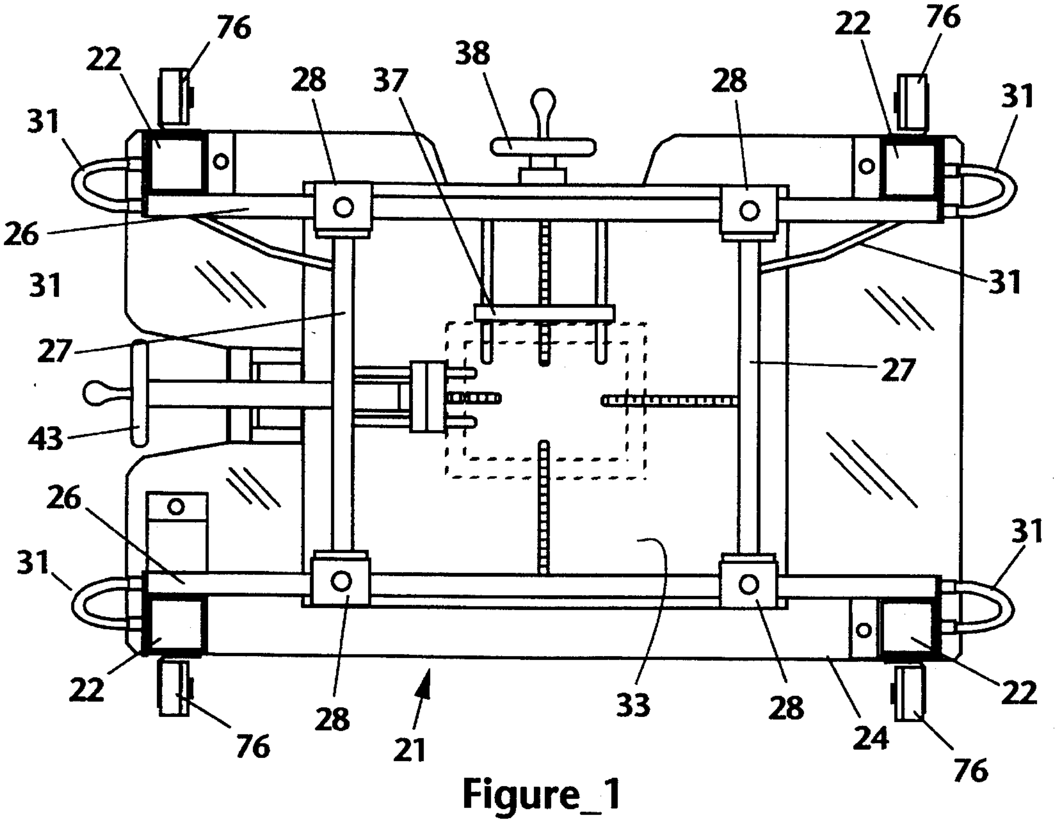
FIG. 1 is a plan view of the frame portion of the apparatus of the invention for placing fasteners in the interior surface of a picture frame to secure the glazing, artwork, and backing within the frame.

The present invention generally comprises a method and apparatus for final assembly of framed artwork by installation of fasteners to secure a backing member which retains the artwork and glazing within the frame. With regard to FIGS. 1 and 2, the apparatus includes a structure 21 for supporting a picture frame during the final assembly process. The structure 21 is comprised of four vertical supports 22 disposed in a rectangular array, each having a pad 23 for stable ground engagement. A base plate 24 extends horizontally between the vertical supports 22 and is secured rigidly thereto. A pair of tubular rectangular beams 26 extend longitudinally in parallel, spaced apart relationship superjacent to the base plate 24, and are secured at opposed ends to the upper ends of respective vertical supports 22. Another pair of tubular rectangular beams 27 extend laterally in parallel, spaced apart relationship superjacent to the base plate 24, and are oriented orthogonally to the longitudinal beams 26. Sleeves 28 secured to the ends of the lateral beams 27 engage the longitudinal beams in slidable fashion, so that the lateral beams may be slidably positioned along the longitudinal beams. A plurality of clamping devices 29 are provided, each associated with one of the sleeves 28, so that each lateral beam 27 may be secured at any selected position along the longitudinal beams 26.

The vertical supports 22 and longitudinal and lateral beams 26 and 27 are comprised of tubular rectangular beams that all include interior spaces sealed in pressure-tight fashion. Air hose connectors 31 join the interior spaces of all the tubular beams to form an air pressure reservoir which is connected to a source of air pressure to supply all the pneumatic actuators enumerated herein.

Extending upwardly from the base plate 24 are four posts 32 which are spaced inwardly from the vertical supports 22. A table 33 includes holes extending through the corners thereof to engage the posts 32 in slidable engagement. A pneumatic actuator 36 is secured to the base plate 24 and disposed to engage the center of the table, so that the actuator 36 may raise and lower the table 33 within limits established by adjustable upper stops 34 on the posts 32. A rear positioning fence 37 is slidably secured to the table 33, and selectively adjusted by a screw jack assembly 38. A side positioning fence assembly 39 includes a side fence 41 secured to the end of a pneumatic actuator 42. The fence 39 and actuator 42 are supported by a screw jack assembly 43, so that the fence 41 may position a picture frame on the table prior to final assembly, and the actuator 42 may be activated to eject the finished frame from the table subsequent to final assembly.

Figure 3:
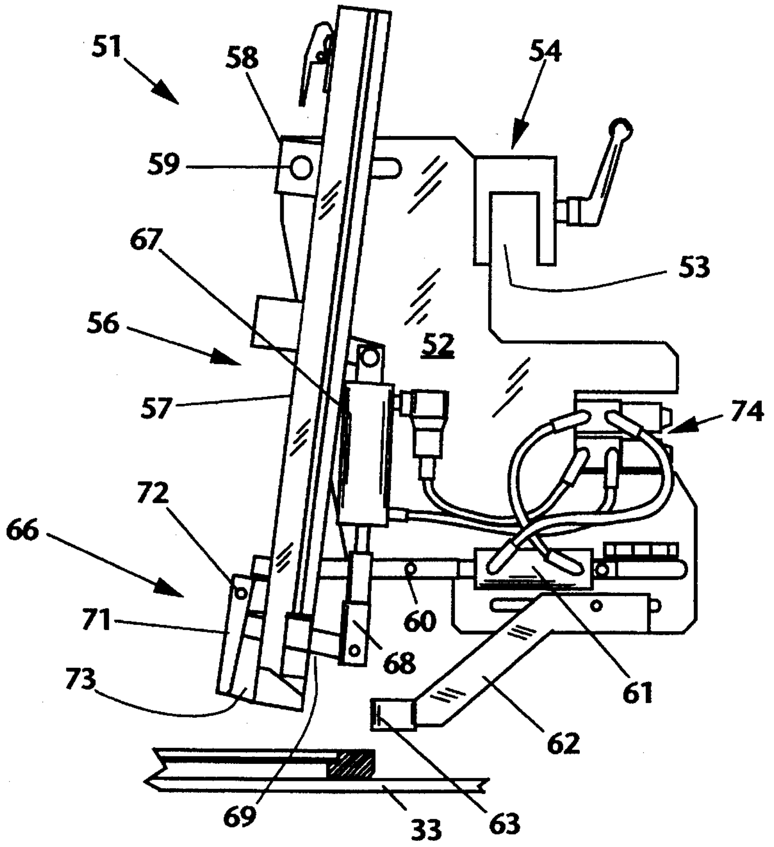
FIG. 3 is a plan elevation of a module of the invention for storing and driving fasteners into a picture frame, shown in the quiescent position.

The invention also includes a plurality of modules 51 for storing and driving tabs or similar fasteners into the interior surface of the opening of a picture frame to retain the backing member in the opening and secure the glazing and artwork in the frame. With reference to FIG. 3, each module 51 is comprised of a panel 52 adapted to be vertically disposed. A dogleg cutout 53 is formed in one edge of the panel 52 and dimensioned to accept one of the longitudinal or lateral beams 26 or 27, whereby the module 51 may be supported in suspended relationship on a selected beam 26 or 27. A clamp 54 is disposed astride the interior end of the cutout 53 to selectively secure the module at any desired position along the lateral or longitudinal beams. A magazine assembly 56 includes a magazine 57 for storing a large plurality of fasteners. Extending from the magazine 57 is a journal 58 for pivotally engaging a shaft 59 protruding from the panel 52, so that the magazine assembly is pivotally secured to the shaft 59 and generally depending therefrom. A pneumatic actuator 61 is secured to a lower portion of the panel 52, with the armature 60 thereof extending laterally and secured to a lower portion of the magazine assembly 56. An arm 62 extends obliquely downwardly from the lower end of the panel 52 and terminates in an anvil 63. The actuator 61 is operable to rotate the lower end of the magazine toward and away from the anvil 63, so that a picture frame may be clamped therebetween, as will be described below. The anvil arm 62 and the actuator 61 are adjustably positionable in a lateral direction on the panel 52 to accommodate frames of varying width dimensions.

Joined to a lower portion of the magazine assembly 56 is a fastener driver assembly 66. The assembly 66 includes a pneumatic actuator 67 secured to the magazine 57, with the armature 68 secured to a transverse lever 69. A drive lever 71 is pivotally secured at its upper end to a pin 72, and the lower end of the drive lever supports a fastener driver blade 73. The transverse lever 69 is rigidly secured to an upper portion of the drive lever 71, so that retraction of the armature 68 rotates the drive lever 71 toward the lower end of the magazine. The drive lever in turn causes the driver blade to engage the lowermost fastener in the magazine and drive that fastener forcefully toward the anvil 63, whereby the fastener is deeply embedded in the interior surface of the frame.

Figure 2:
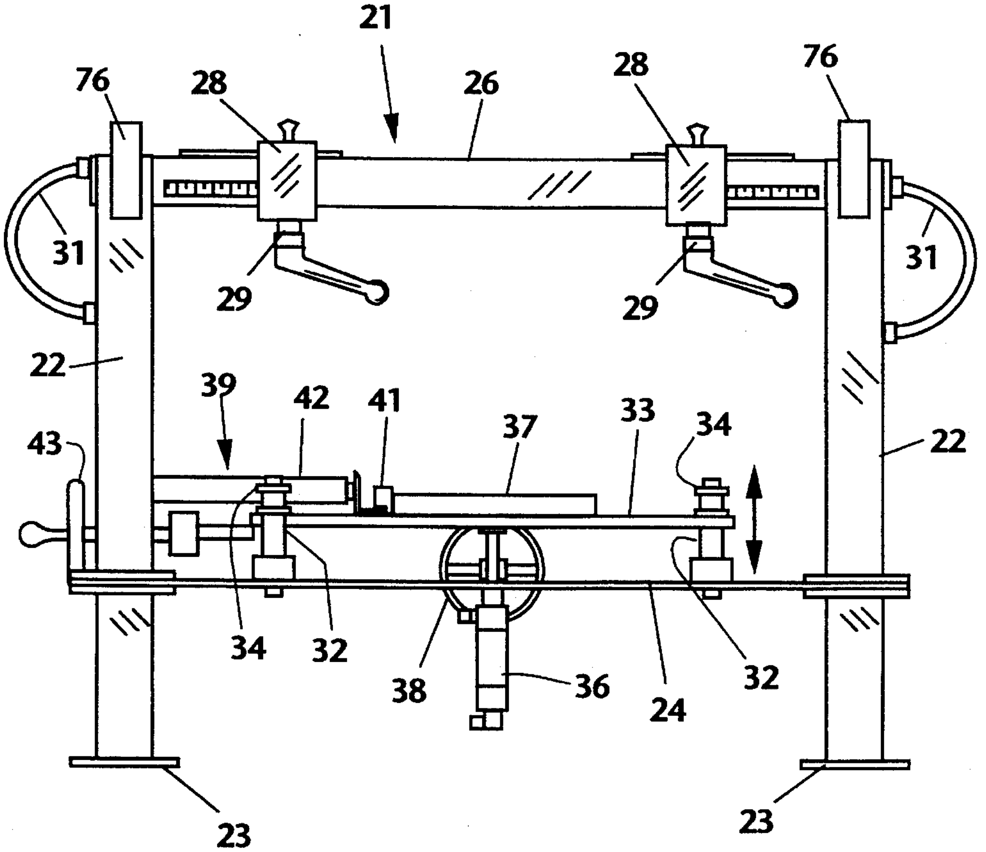
FIG. 2 is a front elevation of the apparatus depicted in FIG. 1.

A pneumatic relay 74 is supported on the panel 52 to distribute air pressure to the pneumatic actuators 61 and 67. The relay 74 is connected through an air hose (not shown) to one of several air hose connectors provided in the longitudinal and lateral beams 26 and 27. Operating power and signal power is provided to the relay 74 by junction boxes 76 supported on the structure 21 (FIGS. 1 and 2). It may be noted that each module 51 is self-contained and may be disposed at any location on the longitudinal and lateral beams 26 and 27, connected to air pressure and electrical and signal power, and operated automatically to apply fasteners to picture frames. All pneumatic actuators are double-acting cylinders, unless otherwise noted, except actuator 67, which may also be spring-assisted.

Figure 8:
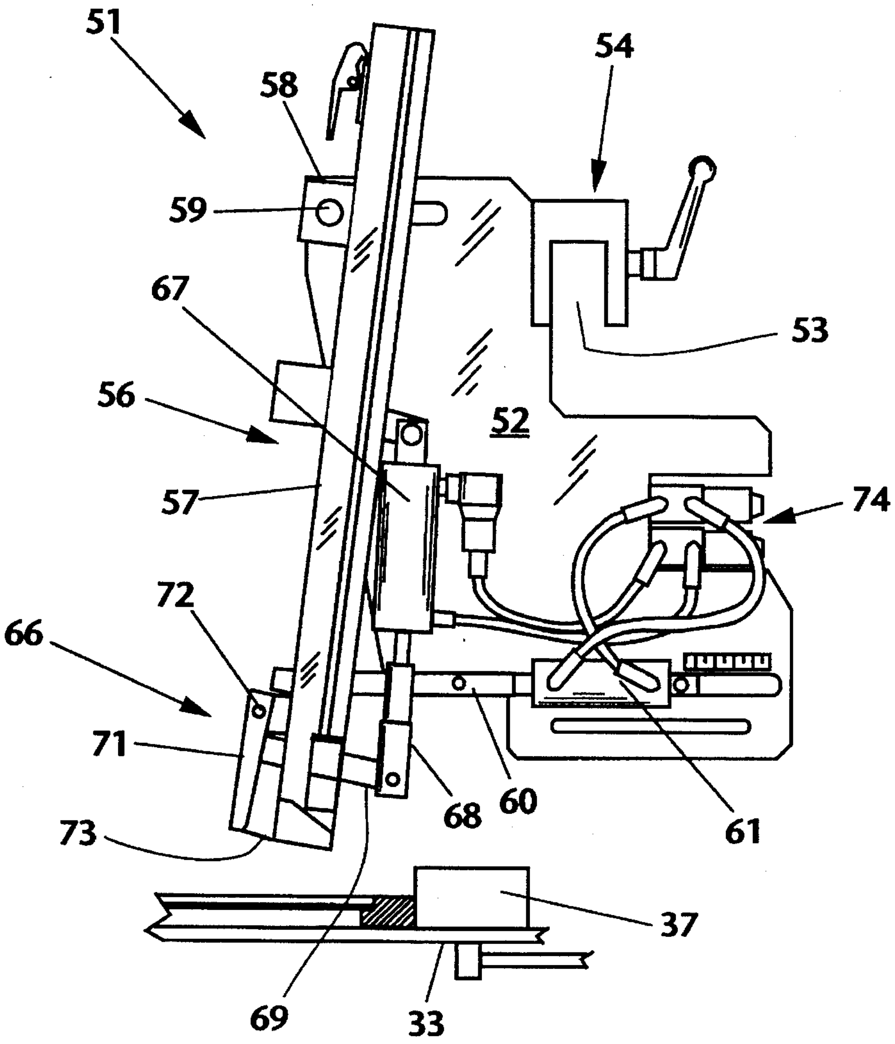
FIG. 8 is a plan elevation of a modified module of the invention for use in conjunction with a positioning fence of the apparatus.

The module 51 described above is used in positions on the apparatus in which the positioning fences 37 and 41 are absent. The module may be modified, as shown in FIG. 8, by removing the anvil and-arm 62 and 63, so that the fences 37 and 41 may be used as anvils against which the fastener mechanism may operate.

Figure 9:
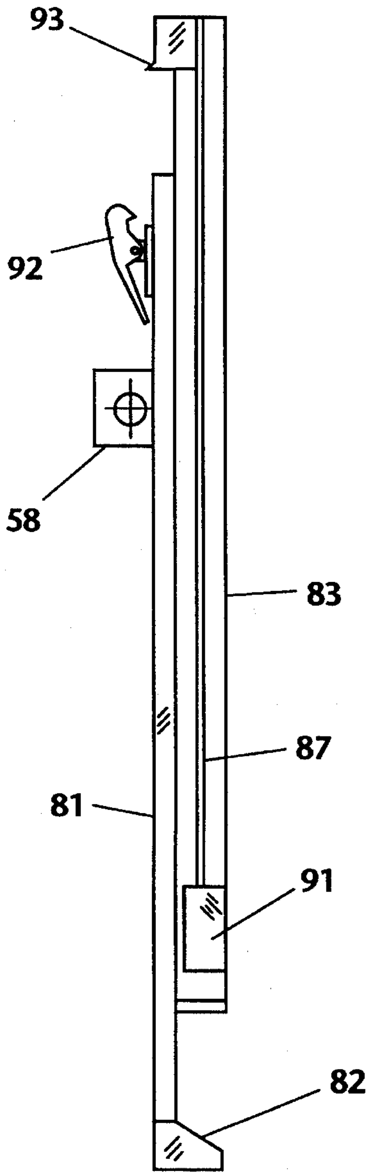
FIG. 9 is a plan elevation of the magazine portion of the module, shown in a partially opened disposition.
Figure 10:
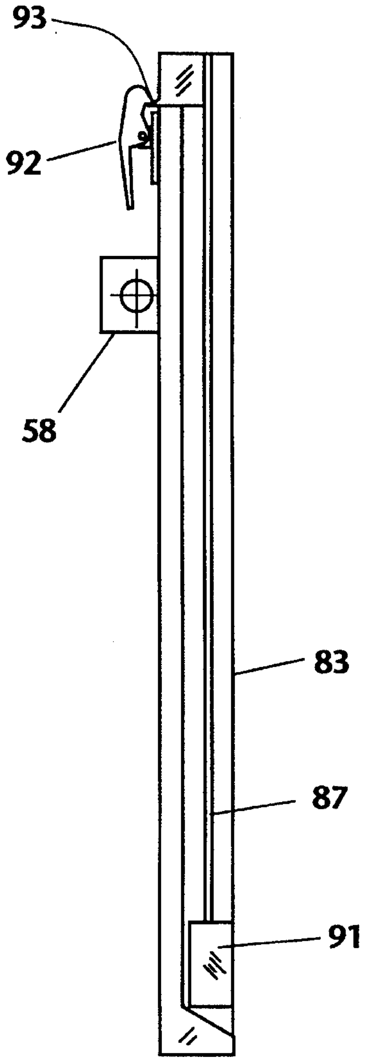
FIG. 10 is a plan elevation of the magazine portion of the module, shown in a fully closed disposition.
Figure 11:
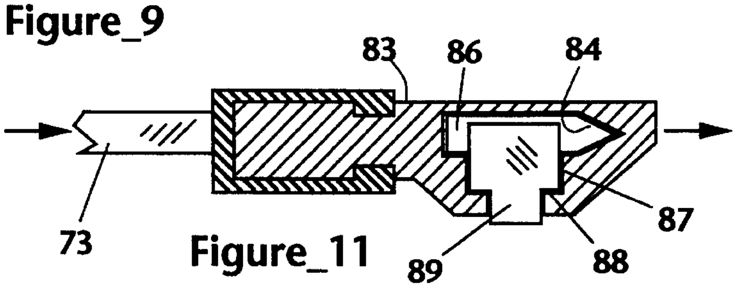
FIG. 11 is an enlarged cross-sectional view of the magazine portion of the module of the invention.
Figure 12:
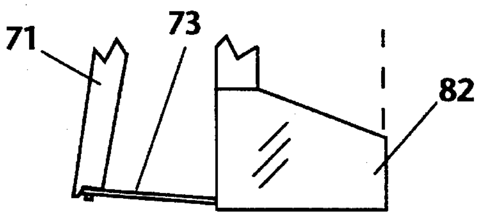
FIG. 12 is an enlarged partial elevation of the magazine depicting the foot portion of the magazine and the fastener driver blade assembly.
Figure 13:
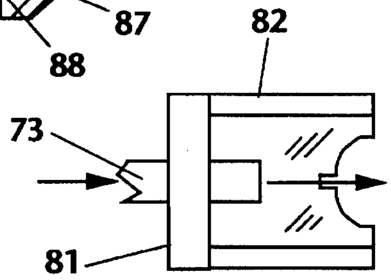
FIG. 13 is an enlarged partial side view of the foot portion of the magazine.

With regard to FIGS. 9–13, the magazine is comprised of a strut 81 that is provided with a channel-like configuration, with the journal 58 extending from the outer surface of the channel. A foot portion 82 is formed at the lower end of the strut 81, and the fastener driver blade 73 extends into the foot portion, as shown in FIGS. 12 and 13. The magazine further includes a longitudinal member 83 that is slidably secured in the channel portion of the strut 81, as shown in FIGS. 9 and 10. An interior chamber 84 extends longitudinally the length of the member 83, and is provided with a cross-sectional configuration that accommodates the plan dimensions of the fasteners 86 used to secure the frame backing. The chamber is thus configured to store a large plurality of fasteners 86 in a vertically stacked column, with the pointed ends of the fasteners oriented toward the ejection direction. The lower end of the column is disposed in the foot portion of the strut 81 and the lowermost fastener of the column is engageable by the driver blade 73 to be ejected and driven into the picture frame.

The member 83 further includes a slot 87 disposed longitudinally therein and extending from the exterior surface to the interior chamber 86. The slot 87 includes a stepped opening 88 to retain a feed slide 89 which engages the upper end of the column of fasteners 86. The feed slide 89 is connected to a spring feed mechanism 91 to exert a downward force on the column of fasteners, so that a new fastener 86 is urged into position to be engaged by the driver blade 73 at the end of each fastener dispensing cycle. The chamber 84 is generally filled from the open upper end thereof. A latch 92 secured to the upper end of the strut 81 is disposed to engage a detent 93 extending from the upper end of the member 83, so that the components 81 and 83 are secured together as shown in FIG. 10. The latch 92 may be released manually to slide the member 83 upwardly in the channel portion of strut 81, as shown in FIG. 9, to clear any jam or correct a feed malfunction.

Figure 4:
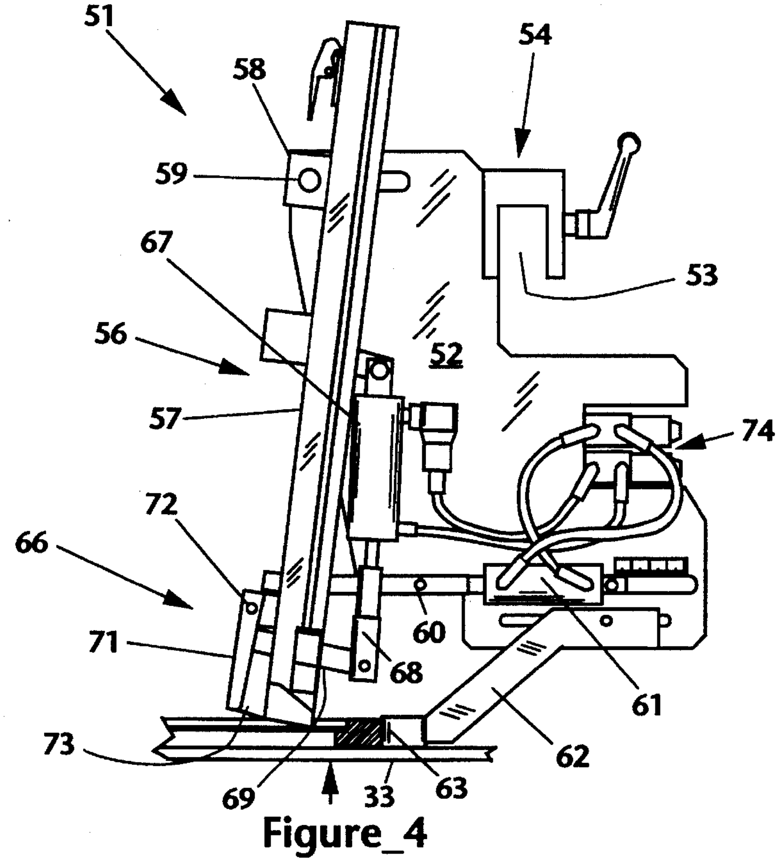
FIG. 4 is a plan elevation as in FIG. 3, showing the table of the apparatus raised to position a picture frame in working relationship to the module.
Figure 5:
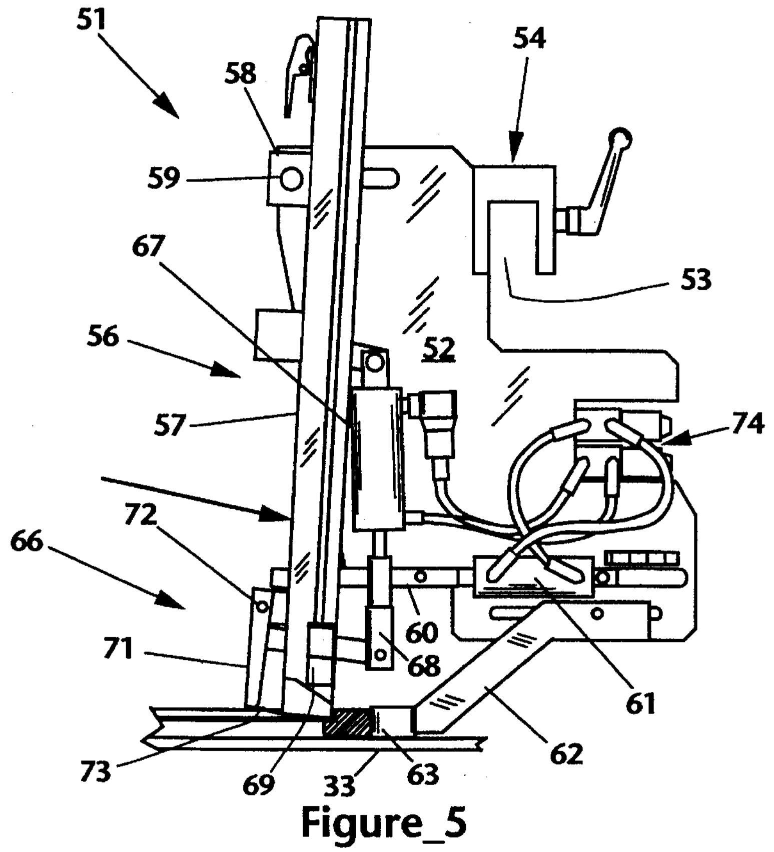
FIG. 5 is a plan elevation as in FIG. 4, showing the magazine of the module rotated to clamp the picture frame to the anvil of the module.
Figure 6:
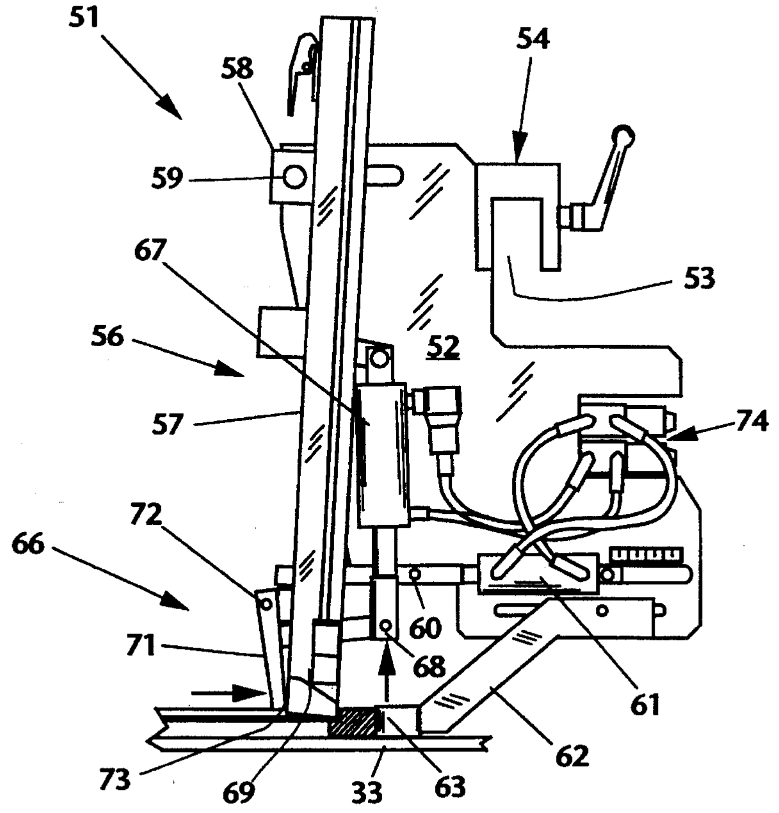
FIG. 6 is a plan elevation as in FIG. 5, showing the fastener driver assembly activated to place a fastener into the interior surface of the clamped picture frame.

The method of the invention involves, in its broadest aspect, the use of the apparatus described above for finish assembly of picture frames. A picture frame 95 is placed on the table 33 and properly positioned for work by the fences 37 and 41, as shown in FIGS. 1 and 8. The table is then elevated by pneumatic actuator 36, as shown in FIGS. 2 and 4, so that the frame rails are disposed between the anvils 63 and feet 82 of the modules 51. Pneumatic actuator 61 is then activated to rotate the magazine assembly 56 and clamp the frame rail between the foot 82 and anvil 63 (or fences 37 or 41 ) of each module (FIG. 5). Actuator 61 remains activated while actuator 67 is operated to rotate the drive lever 71 and cause the driver blade 73 to eject a fastener from the bottom of the column of fasteners in member 83.

Figure 7:
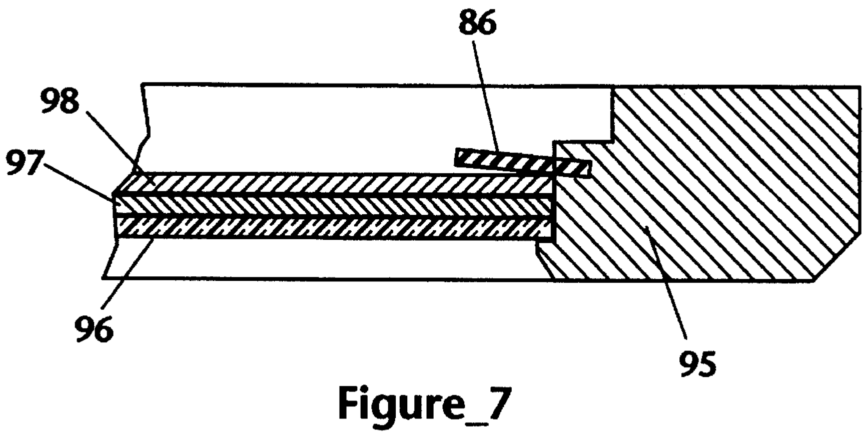
FIG. 7 is an partial cross-sectional elevation of a picture frame with a fastener placed therein by the apparatus of the invention.

Actuator 67 is retracted to retract the drive blade and permit the feed slide 89 to advance a new fastener 86 into position to be dispensed in a subsequent cycle. Actuator 61 is then retracted to release the clamping action on the frame, and actuator 36 is retracted to lower the table 33. Actuator 42 is then activated and retracted to push the finished frame off the table 33, clearing the way for the initiation of another frame finishing cycle. The cycle described may be carried out in as little time as one second, due in large part to the fact that all modules 51 are actuated simultaneously to install fasteners in the frame. The finished frame (FIG. 7) thus includes glazing 96 and artwork 97 held within the frame 95 by backing 98, which is lodged in the frame by the tails of fasteners 86 impinging on the backing 98.

Figure 14:
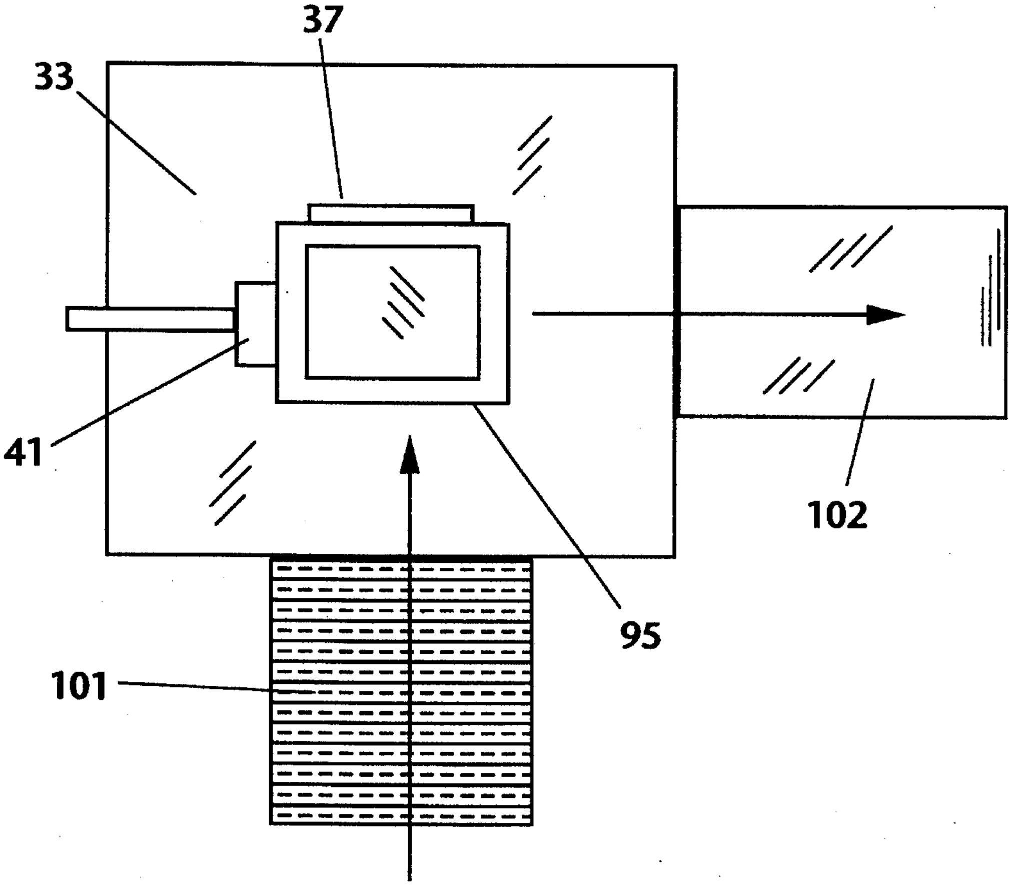
FIG. 14 is a plan view of a further embodiment of the invention for automatically supplying and removing frames from the table of the apparatus.
Figure 15:
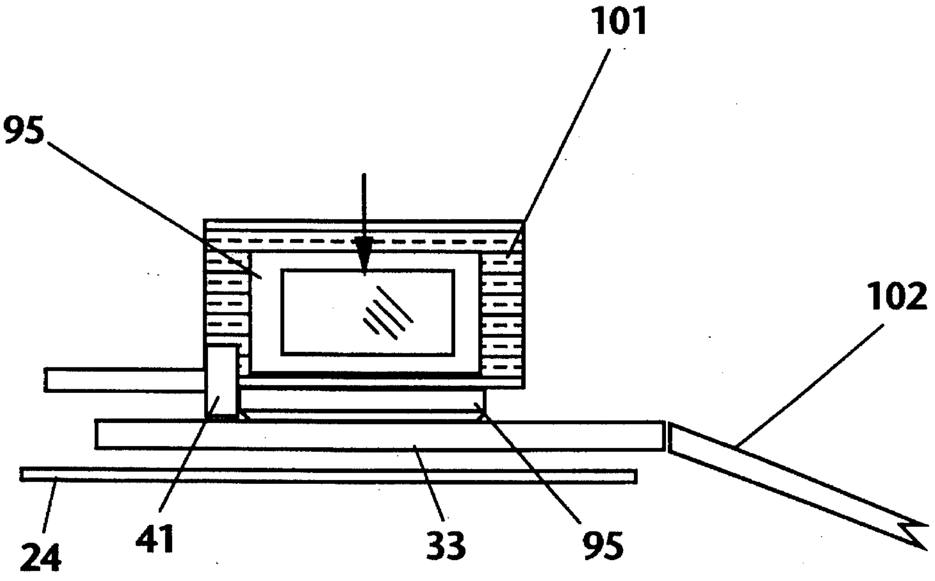
FIG. 15 is front elevation of the embodiment shown in FIG. 14.

A further aspect of the method of the invention, as shown in FIGS. 14 and 15, includes the automation of the process described above. A conveyor belt 101, chute, or similar article moving device is located adjacent to the apparatus 21 and disposed to deliver picture frames 95 serially and sequentially to the table 33. The conveyor 101 is operated periodically in response to the completion of a frame finishing cycle, as described above, to load an unfinished picture frame onto the table 33 as needed. In addition, a ramp 102 extends downwardly from a position adjacent to the table to receive the frames 95 as they are finished and ejected by the ejector fence 41. By operating the conveyor 101 in synchronism with the apparatus 21 and modules 51, the method may be practiced as a continual reiteration of the frame finishing cycle described above, and production of high quality picture frames may proceed at a very rapid pace.

I claim:

1. An apparatus for securing artwork in a picture frame, including;

a table for supporting the picture frame, a support structure extending superjacently of said table;

at least one fastener module secured to said support structure and disposed to drive a fastener into the picture frame supported on said table for securing the artwork in the picture frame.

2. The apparatus of claim 1, further including table elevating means secured to said support structure and extending to said table to raise and lower said table relative to said fastener module.

3. The apparatus of claim 1, wherein said table extends in a nominal plane, and further including fence means extending upwardly from said table to position the picture frame in the plane of said table relative to said at least one fastener module.

4. The apparatus of claim 3, wherein said fence means includes at least one fence, and means for adjustably positioning said at least one fence on said table.

5. The apparatus of claim 3, wherein said fence means includes at least one fence, and first actuator means for selectively translating said at least one fence reciprocally to eject the picture frame from said table.

6. The apparatus of claim 1, wherein said support structure includes at least one beam extending superjacently of said table.

7. The apparatus of claim 6, wherein said at least one fastener module includes a slot for receiving said beam to support said at least one fastener module above said table.

8. The apparatus of claim 7, wherein said at least one fastener module includes magazine means for storing and dispensing a plurality of said fasteners.

9. The apparatus of claim 1, wherein said support structure includes a pair of longitudinal beams disposed in parallel, spaced apart relationship, a pair of lateral beams extending between said longitudinal beams and disposed orthogonally to said longitudinal beams, and means for adjustably positioning said lateral beams along said longitudinal beams.

10. The apparatus of claim 9, wherein said longitudinal and lateral beams are comprised of hollow tubular member sealed at opposed ends, and means for connecting said hollow tubular members to form an air pressure reservoir.

11. The apparatus of claim 10, further including a plurality of fastener modules supported on said longitudinal and lateral beams in adjustably positionable fashion, said plurality of fastener modules including pneumatic actuator means for driving fasteners into a picture frame.

12. The apparatus of claim 11, further including means for connecting said pneumatic actuator means of said plurality of modules to said air pressure reservoir within said hollow tubular members.

13. The apparatus of claim 12, further including means for operating said pneumatic actuator means of said plurality of modules concurrently to drive a plurality of fasteners into the picture frame generally simultaneously.

14. The apparatus of claim 1, further including means for delivering a plurality of picture frames singly and sequentially to said table for application of said fasteners, and means for removing said plurality of picture frames singly and sequentially after application of said fasteners.

15. The apparatus of claim 14, wherein said means for delivering comprises a conveyor adapted to support and move said plurality of picture frames to said table in incremental fashion.

16. The apparatus of claim 14, wherein said means for removing said plurality of picture frames includes ejector means coupled to said table, and a chute disposed to receive said picture frames ejected from said table.

17. An apparatus for securing artwork in a picture frame, including;

a table for supporting the picture frame, a support structure extending superjacently of said table;

at least one fastener module secured to said support structure and disposed to drive a fastener into the picture frame supported on said table;

said support structure including at least one beam extending superjacently of said table;

said at least one fastener module including a slot for receiving said at least one beam to support said at least one module above said table;

said at least one fastener module including magazine means for storing and dispensing a plurality of said fasteners; and, means for securing an upper end of said magazine means to said at least one fastener module in rotatable fashion, and second actuator means extending from said at least one fastener module to a lower end of said magazine means to rotate said lower end toward anvil means for clamping a picture frame therebetween.

18. The apparatus of claim 17, wherein said anvil means comprises an anvil extending from said at least one fastener module.

19. The apparatus of claim 17, wherein said anvil means comprises a frame positioning fence extending upwardly from said table.

20. The apparatus of claim 17, wherein said magazine means includes interior chamber means for storing a plurality of said fasteners in a column having an upper end and a lower end.

21. The apparatus of claim 20, further including fastener driver means for engaging the lowermost fastener in said column of fasteners and driving said lowermost fastener into the picture frame.

22. The apparatus of claim 21, wherein said fastener driver means includes a driver blade disposed to translate reciprocally through said lower end of said column in said magazine means.

23. The apparatus of claim 22, further including a drive lever pivotally secured at one end to said magazine means and at an opposed end to said driver blade.

24. The apparatus of claim 23, further including third actuator means secured to said magazine means and coupled to said drive lever to rotate said drive lever to translate said driver blade.

25. The apparatus of claim 22, further including resilient means impinging on said upper end of said column of fasteners to urge said fasteners toward said driver blade.

* * * * *